United States Patent
Nyman et al.

[11] Patent Number: 5,185,081
[45] Date of Patent: Feb. 9, 1993

[54] METHOD AND APPARATUS FOR MIXING AND SEPARATING TWO LIQUID PHASES WHILE PREVENTING AERATION AND EMULSIONS USING A MIXER-SETTLER

[75] Inventors: Bror G. Nyman, Ulvila; Stig-Erik Hultholm, Pori; Launo L. Lilja, Pori; Valto J. Mäkitalo, Pori, all of Finland

[73] Assignee: Outokumpu Oy, Espoo, Finland

[21] Appl. No.: 675,443

[22] Filed: Mar. 26, 1991

[30] Foreign Application Priority Data

Apr. 4, 1990 [FI] Finland .................................. 901691

[51] Int. Cl.⁵ .......................... B01D 11/04; B01F 7/24
[52] U.S. Cl. .................................... 210/634; 210/511; 210/513; 210/801; 210/DIG. 5; 366/292; 366/320; 366/348; 422/228; 422/229; 422/259
[58] Field of Search .............. 210/511, 634, 513, 801, 210/DIG. 5; 366/136, 265, 293, 318, 320, 325, 348, 292; 422/258, 259, 228, 225, 229; 423/157

[56] References Cited

U.S. PATENT DOCUMENTS

| | | | |
|---|---|---|---|
| 3,804,594 | 4/1974 | Orjans et al. | 422/259 |
| 4,022,438 | 5/1977 | Shishido et al. | 366/325 |
| 4,221,658 | 9/1980 | Hardwick | 422/259 |
| 4,292,277 | 9/1981 | Bonney et al. | 422/259 |
| 4,391,711 | 7/1983 | Jackson et al. | 210/634 |
| 4,548,765 | 10/1985 | Hultholm et al. | 422/225 |
| 4,628,391 | 12/1986 | Nyman et al. | 366/348 |
| 4,721,571 | 1/1988 | Nyman et al. | 210/634 |
| 4,747,694 | 5/1988 | Nyman et al. | 366/348 |
| 4,786,187 | 11/1988 | Nyman et al. | 366/136 |
| 5,078,505 | 1/1992 | Nyman et al. | 366/292 |

FOREIGN PATENT DOCUMENTS

| | | | |
|---|---|---|---|
| 266740 | 4/1989 | Fed. Rep. of Germany | 422/259 |
| 731997 | 5/1980 | U.S.S.R. | 366/320 |
| 2117666 | 10/1983 | United Kingdom | 366/348 |

*Primary Examiner*—Joseph W. Drodge
*Attorney, Agent, or Firm*—Brooks Haidt Haffner & Delahunty

[57] ABSTRACT

A method and apparatus for mixing two different phases in a liquid-liquid extraction process and for separating the phases employs a spiral stirrer having two tubular coils for creating homogeneous circulation throughout a mixer. The stirrer rotates at a relatively slow speed to create an upward flow from bottom to top of the mixer near the mixer periphery and a downward flow in the middle of the mixer. The mixer has a flow reversing profile ring and is designed to prevent aeration and formation of an emulsion.

10 Claims, 6 Drawing Sheets

METHOD AND APPARATUS FOR MIXING AND SEPARATING TWO LIQUID PHASES WHILE PREVENTING AERATION AND EMULSIONS USING A MIXER-SETTLER

The present invention relates to a method for mixing the two different liquid phases of a liquid-liquid extraction process together in a controlled fashion, without using high circumferential speeds of the stirrer, and for separating the said mutually dispersed liquids from each other. The invention also relates to an apparatus for realizing the mixing and separation.

The technical applications in liquid-liquid extraction are based on a controlled dispersion of the liquid phase in order to achieve a desired material transfer between the liquid phases in question. It is important that after the mixing operation, the created dispersion is again easily separated, owing to mere gravity, into two solution layers on top of each other.

In a small scale, when speaking of mixers smaller than 10 $m^3$, there normally are no difficulties in controlling the dispersion. The solutions can generally be mixed so that the mixing does not endanger the separation of the solutions. A dispersed state also is achieved in the top and bottom spaces of the mixer, although the stirrer rotates at rates corresponding to a fairly low circumferential speed of the stirrer. Thus the dispersion takes place in a shear rate area where the created drops are not very small, and in that case the separation rate of the solutions normally is satisfactory. This again secures the operation of the solution separation section of the extraction apparatus, i.e. the operation of the settler. However, the question how completely the solutions are separated depends on the employed dispersion technique. The more homogeneous and large the created drop size, the better the separation results in normal conditions, and therefore the attempts towards appropriate dispersion are important even in small extraction plants. The problem with large extraction arrangements is a high circumferential speed in the turbine. Van Heuven and Beek already pointed out in their congress paper "Power input, drop size and minimum stirrer speed for liquid-liquid dispersions in stirred vessels", ISEC 1971, International Solvent Extraction Conference, 1971, The Hague, that the circumferential speed of a turbine stirrer is bound to increase while changing over to larger turbine sizes. In mixers over 10 $m^3$, the problematic proportion of small droplets tends to increase to a disturbing amount, thus making the final separation of the solutions difficult. Drops of the aqueous solution remain in the organic extraction solution, thus weakening the purity of the final product. Respectively, drops of the extraction solution remain in the aqueous solutions, also causing losses in the extraction solutions. The situation may become increasingly difficult to such an extent, particularly as regards arrangements of very large sizes, that in the apparatus there are created permanent emulsions which endanger the functionality of the said extraction process.

Large extraction apparatuses are mainly needed in processes utilizing oxidized copper ores, where the treated solution flows may rise up to 1,000-5,000 $m^3/h$. In order to obviate problems caused by large dimensions, mixing volume of the extraction steps in copper extraction is nowadays often divided between three mixers connected in series, and simultaneously the residence period of the solutions in the mixers is shortened more than is advantageous from the point of view of the extraction process. According to the prevailing practice, the mixers used in copper extraction are of the backmixed mixer type, where the employed stirring member generally is a radial turbine. By using the above described division of the mixer volume, it is attempted to control the need to increase the circumferential speed of the turbine, in order to disperse the total mixer contents to be stirred.

The mixing of air to the dispersion flows is another serious problem in large extraction arrangements. It is difficult to design mixers so that air would not be sucked into large dispersion flows which are stirred and pumped. Air disturbs the operation of the settler, because air bubbles cause vertical circulation in the front part of the settler. The stirring effect of the discharging air may be so powerful that one third of the settler is capable of partial operation only.

An attempt to solve the above described problem concerning the dimensions of extraction mixers is suggested for instance in the U.S. Pat. No. 4,747,694 publication, which describes a method having a vertically proceeding double-loop circulation, and where the dispersion is pumped, by means of a pump mixer, to a level above the surface of the dispersion in the mixer. Dispersion based on vertical circulation does, it is true, cause a remarkable decrease in the rotational speed of the turbine, and simultaneously it eliminates the need to increase the circumferential speed of the turbine when changing over to larger extraction arrangements. But the described apparatus is not capable of solving the problem of air being mixed in the dispersion. The pumping of the dispersion in particular causes air to be mixed in the dispersion.

The U.S. Pat. No. 4,235,602 publication introduces an extraction arrangement where the extraction units are all arranged in a parallel fashion. This arrangement is created by conducting the dispersion from the mixer along the trough running above the settler to the rear end of the settler, wherefrom the dispersion flows into the settler and the separated solutions are discharged from the mixer-side end of the settler. The drawback with this arrangement is that the high circumferential speed of the mixer's stirrer may cause emulsification, and at the same time the dispersion is easily aerated. The dispersion may be partially separated into layers in the trough in between the mixer and the settler, but the phases are mixed anew when they flow from the trough to the settler proper. The equipment described in the said patent publication, such as the mixer, pump and settler, are separate units, and they are not planned to be particularly economic with space. The length of the settler is remarkably greater than its width.

Various spiral impellers are developed, particularly for mixing viscous liquids. In order to create a thorough stirring in such liquids, the diameter of the impeller often is nearly the same as that of the reactor. This type of a impeller is described for example in the U.S. Pat. No. 4,022,438 publication. Against the axis of the impeller, there are supported one or two ribbon like blades which encircle the axis in a spiralling fashion. The free space remaining in between the mixer and the reactor walls is smaller than 5/100 of the inner diameter of the reactor.

The present invention relates to a method for mixing different phases of a liquid-liquid extraction process to each other, so that by means of the created vertical circulation, both the emulsion problem associated with to the circumferential speed of large stirrers and the aerating problem associated with pumped dispersion flows can be solved at the same time. The invention also relates to an extraction step system described in the application, owing to which system the dispersion from the mixer flows more rapidly and more slowly in turns, which arrangement brings about contacts between the small droplets, so that they coalesce into larger drops. The invention also relates to a compact total arrangement of an extraction apparatus and to an apparatus causing dispersion, so that the dispersion is carried out by means of a raising spiral stirrer of a special construction, and the pumping of the dispersion is performed by a pump installed in the settler.

The new method of dispersing is based on a smooth vertical circulation affecting all of the mixer contents, which circulation is achieved by employing a stirring member operated within a low shear rate area. This primary range of influence and physical dimension is deliberately made large, and consequently it has been possible to further decrease the shear rates, by simultaneously making the mixing conditions homogeneous throughout the mixer. The radial dimension of the stirring member is within the range 0.50–0.75R, when R=the radius of the cylindrical mixer, and the vertical dimension is within 0.6–0.9H, when H=the effective height of the mixer. According to an advantageous mixing method, the said stirring member causes a smoothly rising circulation throughout the whole vertical range of its extension, while simultaneously creating certain radial stirring at different heights. Thus the mixer flow ascends along the circumference, turns towards the center when reaching the surface, is then reversed and turns towards the bottom, and is again divided at the bottom and proceeds towards the rims. A certain amount of deliberate stirring is caused between the central and circumferential circulations, in order to cause the solutions fed in the mixer to be more rapidly homogenized throughout the contents of the mixer. The purpose of the vertical flows is to prevent both the separation of solutions with different specific weights and their gathering in the bottom and surface zones.

We ended up with the above described spiralling stirrer type, because our aim was to create circulation conditions as homogeneous as possible throughout the mixer, which means that the flow falling outside the radius 0.7R dividing the transversal area of the mixer into two is ascending, and respectively the flow inside this radius is descending. With the co-effect of the centrifugal force, a smooth vertical circulation is generally created by means of a stirring member with a radial dimension somewhat below 0.7R.

The extraction step system of the present invention improves the utilization of space, because the apparatus can be realized as a compact rectangular structure. The apparatus can be constructed wide, which often is aimed at nowadays, in order to be able to operate with a thin layer of organic solution in the settler. According to the present invention, the length of the settler is at the most as great as its width, in most cases smaller. Both the described mixer-presettler arrangement and the slot cassette arrangement in between the presettler and the settler favour a smooth solution/dispersion feed to the settler throughout the transversal surface of the flowing. If the number of mixers is two, they are installed at such a distance from each other that they by way of their location spread the dispersion flows proceeding in the presettler also to the rims of the presettler. The feeding of dispersion through the feed duct in between the mixers, as well as the location of the mixers near the end of the presettler, effectively moderate the circulation of the supplied dispersion. When also the slot cassette arrangement in between the presettler and the settler offers a clear flow obstacle to the dispersion and the solutions separated in the presettler, the dispersion in the presettler remains in an advantageous fashion in a compact drop formation. This improves the final separation result of the solutions, and at the same time offers a possibility for the continuation of the extraction reactions, i.e. material transfer.

The method and apparatus of the present invention are further described with reference to the appended drawings, where.

Figure 1:
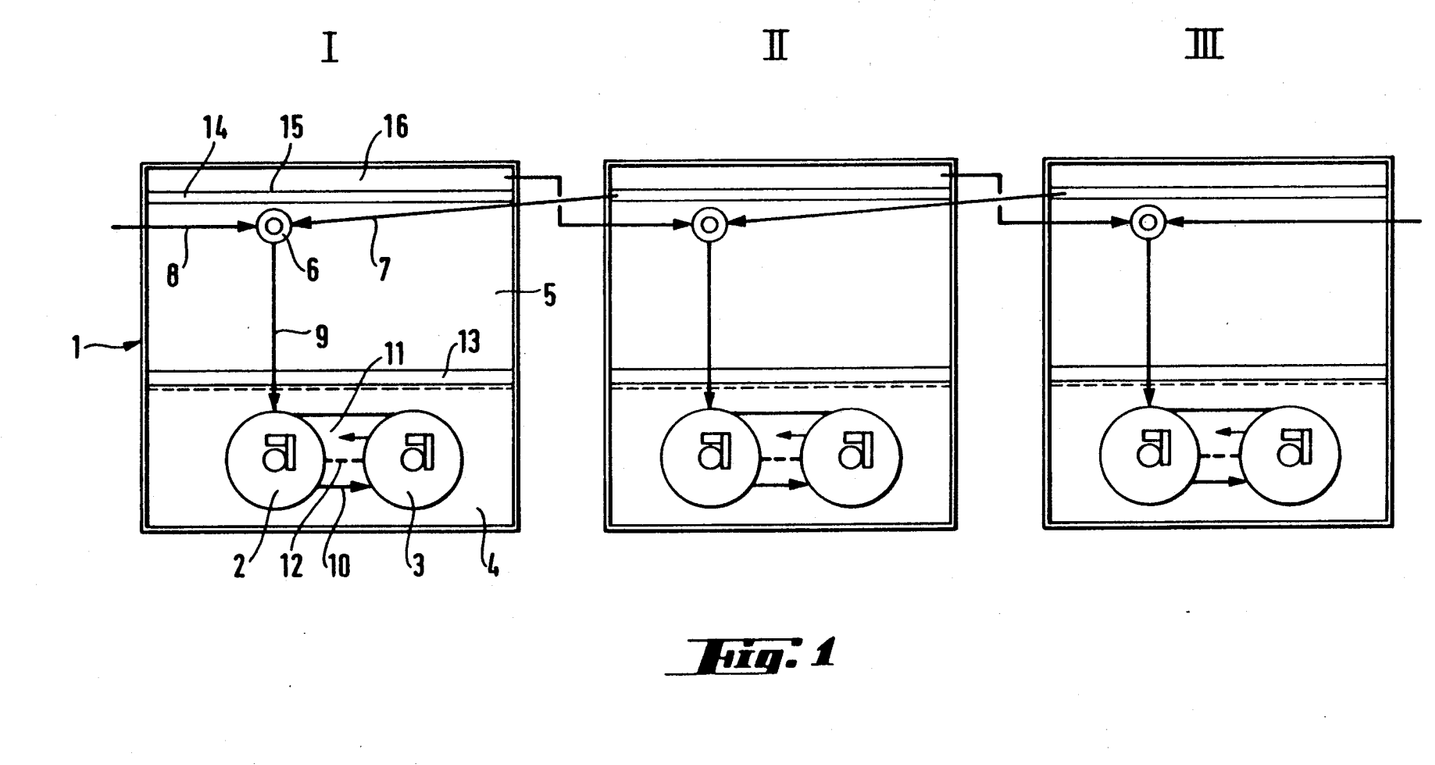
FIG. 1 is an illustration of an assembly of extraction equipment according to the invention, seen from the top.

FIG. 1 shows a general arrangement of extraction equipment, suited for instance to copper extraction, between a solution pump, two mixers, a presettler and a settler. In order to simplify the technical performance, the separate extraction units are rectangular in exterior forms, and in the assembly of FIG. 1, all are similar in structure and parallel in position. The drawing incorporates three mutually identical extraction steps; in the structural study we examine in more detail the first extraction step, where the extracting apparatus 1 comprises two mixers 2 and 3, a presettler 4, a settler 5 and a solution pump 6 installed inside the settler. The solution pump 6 is located at the rear end of the settler 5, and, in the sideways direction, on the same level with the serial mixer 2. The lighter organic solution is conducted along the feed line 7 and the heavier aqueous solution along the feed line 8 to the solution pump. The solutions, mixed together from the pump onwards, are conducted along the common line 9 to the first mixer 2, to the bottom part thereof, wherefrom the dispersion proceeds along the line 10 to another similar mixer 3. The dispersion state is maintained in both mixers by means of the above described vertical circulation. From the mixer 3, the dispersion flows as overflow out to the feed duct 11 of the presettler, wherefrom the dispersion is discharged, through the slot baffle 12, towards the end of the presettler. Now, because of the proximity of the mixers 2 and 3 in the presettler, the dispersion is divided into two equal-sized flows, which proceed around the mixers and turn towards the cassette plates 13, provided with flow slots, which plates separate the presettler 4 and the settler 5 from each other. As is apparent from the drawing, the flow rate of the dispersion varies in the different parts of the presettler, and this enhances the collisions and coalescence of small droplets into large drops. The cassette plates 13 extend over the whole circulation field, from one edge of the extraction apparatus to the other. The slot plate structures are known in the prior art, and so is the surface trough structure 14 designed for collecting the organic solution through surface overflow, and for collecting the aqueous solution through the adjustable overflow 15 to the rear 16 of the cell. From the trough 14 the extraction solution is conducted to the adjacent extraction apparatus along a line corresponding to the feed line 7, and from the rear 16 the aqueous solution is conducted along a pipe corresponding to the feed line 8, to another adjacent extraction apparatus.

Figure 2:
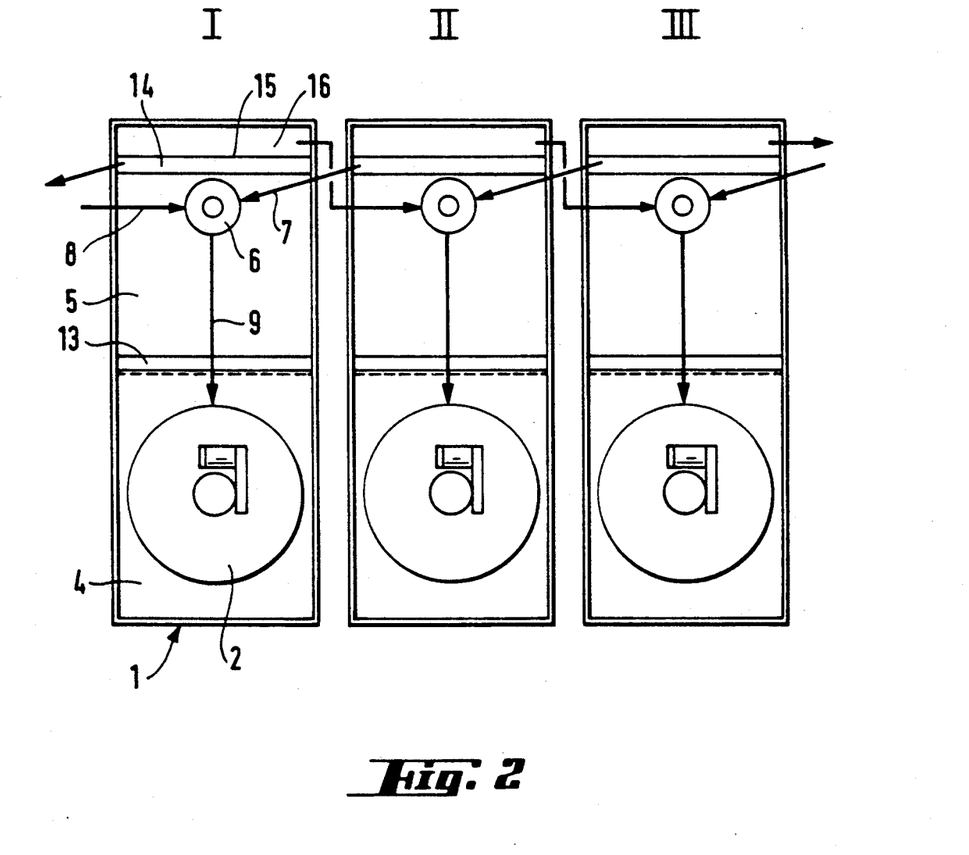
FIG. 2 is an illustration of another assembly of extraction equipment according to the invention

FIG. 2 introduces an extraction step arrangement, where the extraction step comprises only one mixer. As is seen in the drawing, the arrangements are mainly similar to the ones which were explained in more detail in connection to FIG. 1. Here the mixer is likewise placed in the presettler, and the connected solution pump to the rear of the settler. Thus the total length of the required pipelines can be shortened, and at the same time it can be made sure that the separation rate of the solutions conducted to the pump shaft is good. As above, all mixer-settler units are adjusted to be in parallel position.

The installation of the pump, common to the organic solution and the aqueous solution, in the settler, and the installation of two serial mixers in the presettler, as well as the pipework arrangements connected to these solutions enable the turning of the extraction apparatuses in parallel direction, when they previously have in general been placed so that the mixer is in alternating order first in one and then in the other end of the extraction cell. This arrangement also has the advantage that the internal circulations of each extraction step in order to save dispersion can be realized in a very simple manner.

Figure 3:
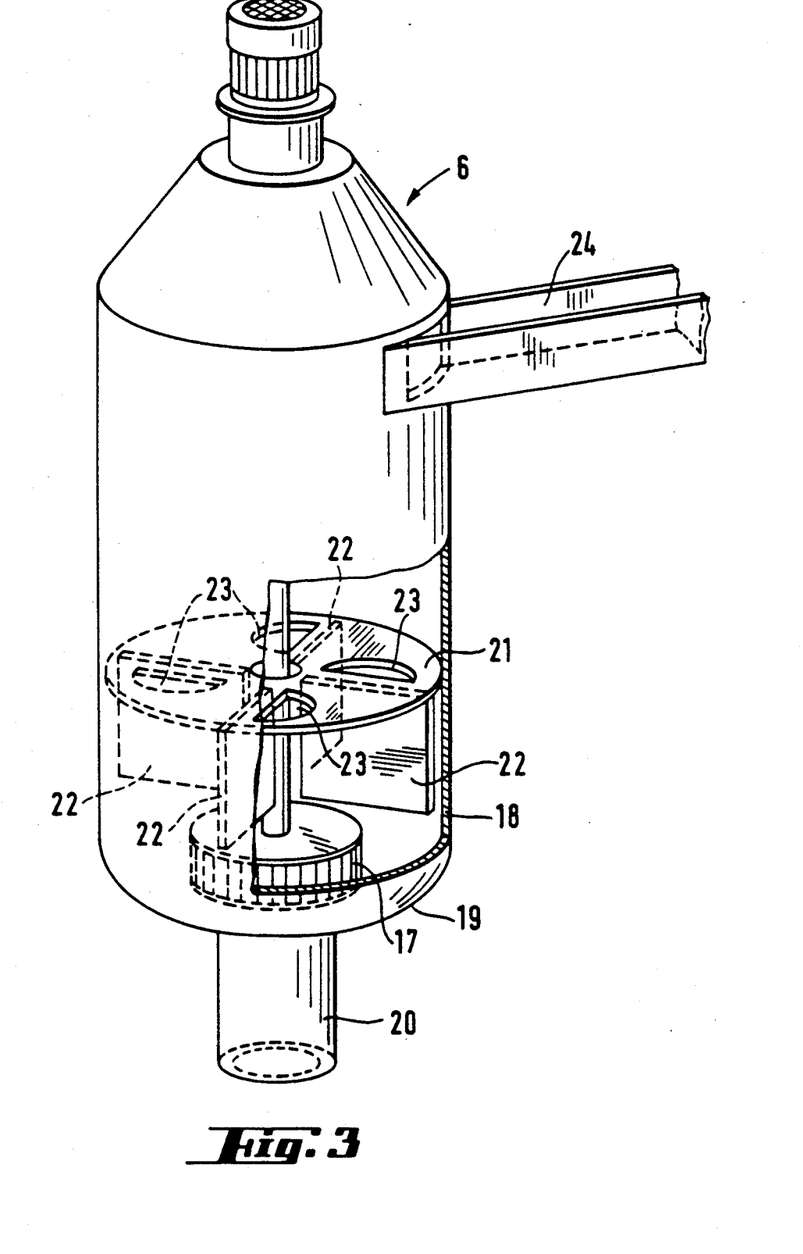
FIG. 3 is an illustration of a solution pump means for the raising of dispersion, seen in a partial cross-section along an oblique axis.

FIG. 3 specifies in more detail the structure of the solution pump 6. The pumping member of the solution pump 6 is for instance a turbine 17, described in the U.S. Pat. No. 4,747,694, or some corresponding turbine structure. The description of the turbine in U.S. Pat. No. 4,747,694 is incorporated herein by reference. The turbine jet is directed upwards with the profile bottom 19 belonging to the pump cylinder 18. The pump cylinder 18 itself is compactly connected to the suction cylinder 20. While proceeding upwards, the pump cylinder is bounded by the horizontal plate 21, which is provided with four baffles 22 preventing rotation. Towards the rotating direction, in front of these baffles the horizontal plate 21 is provided with flow apertures 23, wherethrough the pumped solutions are pushed onto the top surface of the horizontal plate. From here, the solutions are collected to the reception trough 24, and further to the mixer 3 along a pipeline. This is the first serial mixer of the extraction step, or the only mixer thereof, depending on the number of mixers in the said extraction step.

Figure 4:
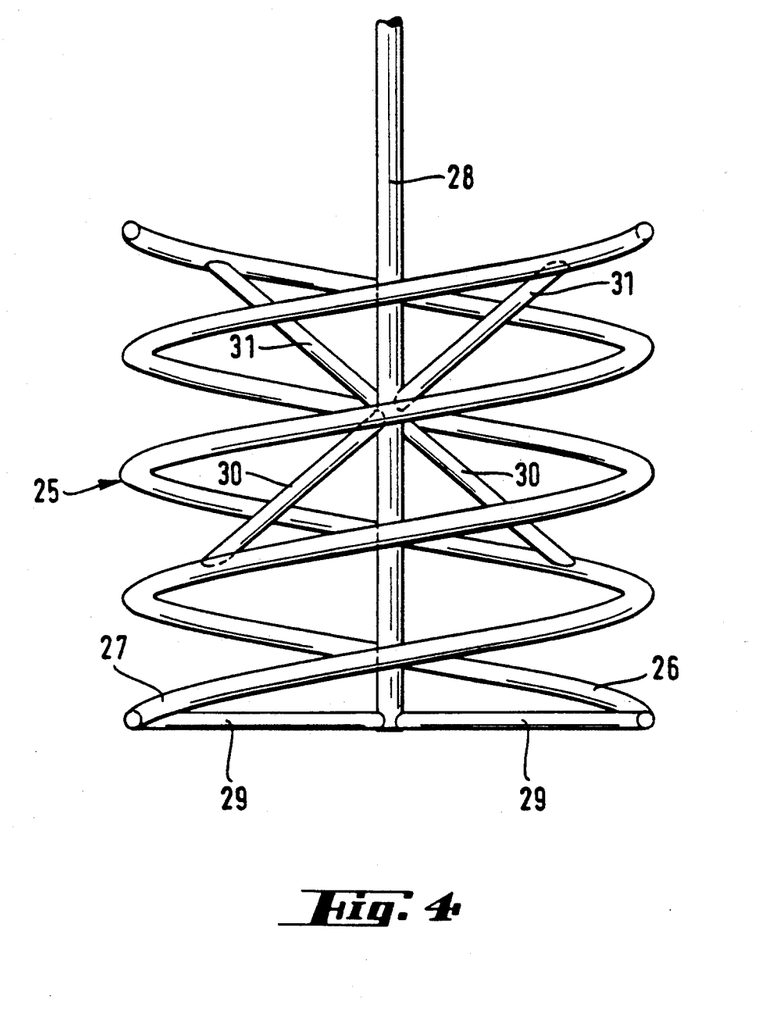
FIG. 4 is a side-view illustration of the spiral stirrer of the invention.

A central phenomenon within the scope of the present invention is a new vertical flow dispersion, the so-called Vertical Smooth Flow=VSF, and the technical realization of the VSF mixer. The spiral stirrer operating in a low shear rate area is advantageously of the type depicted in FIG. 4. In structure the stirring member 25 is a double tube coil. The diameter whereof of the stirring member 25 is 0.5-0.75 times the diameter of the mixer cylinder in which the stirring member is installed and advantageously 0.7 times the cylinder diameter. In the vertical direction, the stirring member extends to the region is 0.6-0.9 times the effective height of the mixer, advantageously 0.82 times the effective height. The bottom clearing is normally equal to the distance of the top end of the stirrer from the liquid surface. The ratio of the diameter of the coil tube to the diameter of the spiral stirrer 25 is between 0.03-0.08, generally about 0.05. The pitch of the coils 26 and 27 of the stirrer member 25 is between 0.25-0.50 times the diameter of the mixer cylinder of the mixer in which the stirring member 25 is mounted, generally 0.35 times the cylinder diameter. The spirals which start ascending from the opposite sides of the axis 28 make about two rotations around the axis, and their direction of ascent is advantageously opposite to the rotatory direction of the stirrer. It is advantageous of the structure of the stirrer that the number of the spirals is two, or another even number, so that they balance each other while starting from opposite sides. It is a well-known drawback in large reactors that the imbalance of the stirrer damages for instance bearings. The mixers 2 and 3 discussed above are VSF mixers.

The structure of the stirrer also includes the support rods 29, 30 and 31, which are advantageously made of the same diameter and kind of metal tube as the coils of the spiral stirrer 25. The support rods are essential for the operation of the stirrer, because they create radial stirring. The lowest support rods 29 are in the stirrer of FIG. 3 placed horizontally, at the ends of the spirals. The rest of the supports meet the axis at an angle of 60°, when a division of 225° is applied between the separate supports. It is an essential detail that the topmost supports 31 descend towards the axis 28, so that they start from the top end of the spirals at an angle of 45° towards the axis. When installed in this fashion, the topmost supports do not break the liquid surface, and consequently do not cause air to be mixed in the dispersion.

Figure 5:
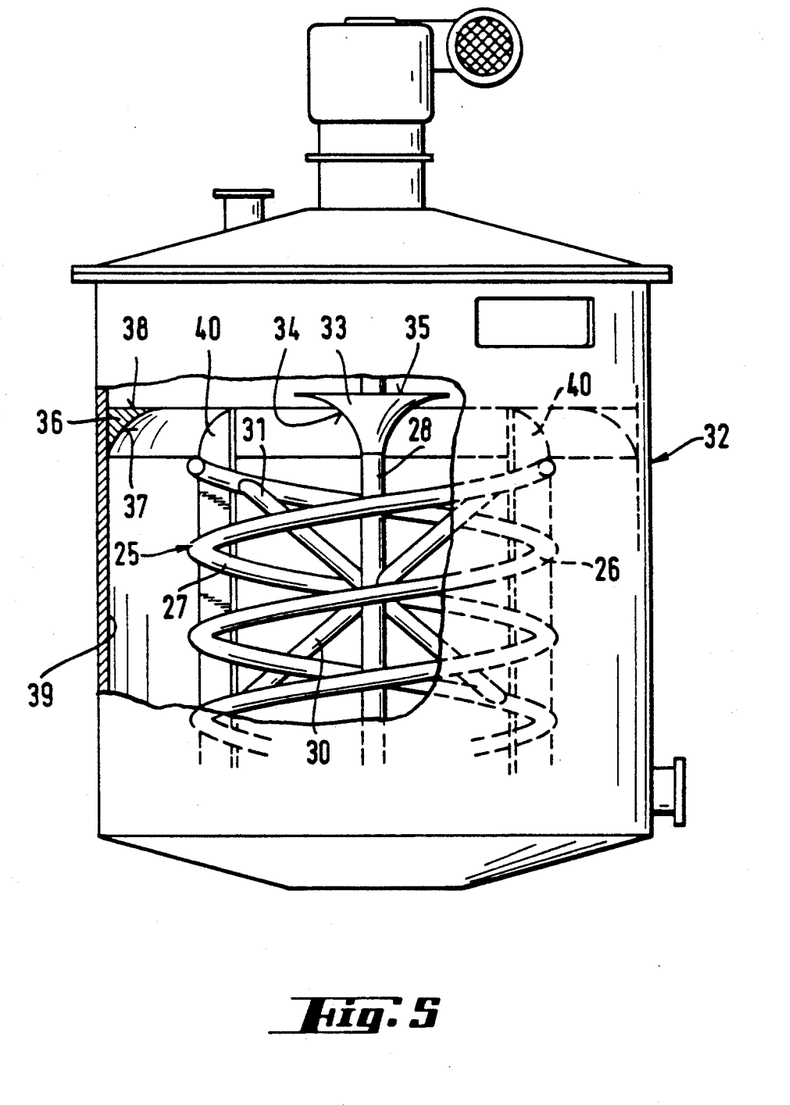
FIG. 5 is an illustration of a mixer of an extraction cell according to the invention, seen in partial cross-section.

FIG. 5 illustrates a stirrer installed in the VSF mixer 32. It is also essential to the stirrer structure that in the top part thereof, immediately below the liquid surface, around the axis there is provided a flow reverser 33. The profiled bottom surface 34 of the flow reverser curves from the nearly horizontal outer edge to the almost vertically ending central pole. The top surface 35 of the flow reverser is for instance horizontal or slightly curved from the center outwards. By means of the flow reverser, the direction of the dispersion circulating in the mixer is turned downwards in the vicinity of the center. As was maintained above, an essential aim of the VSF mixer structure is to avoid the mixing of air into the dispersion resident in the mixer. In order to prevent the mixing of air, in the top space of the mixer 32, immediately below the surface, there is employed, in addition to the said flow reverser, a profile ring 36, which reverses the vertical circulation of the dispersion from the rim towards the center. The bottom surface 37 of the profile ring 36 is smoothly curved, and the top surface 38 is for instance horizontal. On the horizontal level, the ring extends from the stirrer axis (which in the vertical direction is placed in the center of the mixer) onwards, from the distance 0.75×R, as far as the circumference 39 of the mixer cylinder. By means of the structure composed of the flow reverser and the profile ring, which structure controls the conditions in the top part of the mixer, the flow rising upwards from the circumference of the mixer can be turned to circulate towards the center, and again from the center downwards. It is also important that it thus prevents the creation of a standing surface wave motion, which could mix air into the mixer circulation in a particularly disturbing fashion. The outer rims of the mixer also are provided with baffles 40, which are of normal structure.

The baffles prevent horizontal circulation and the creation of vortex.

Figure 6:
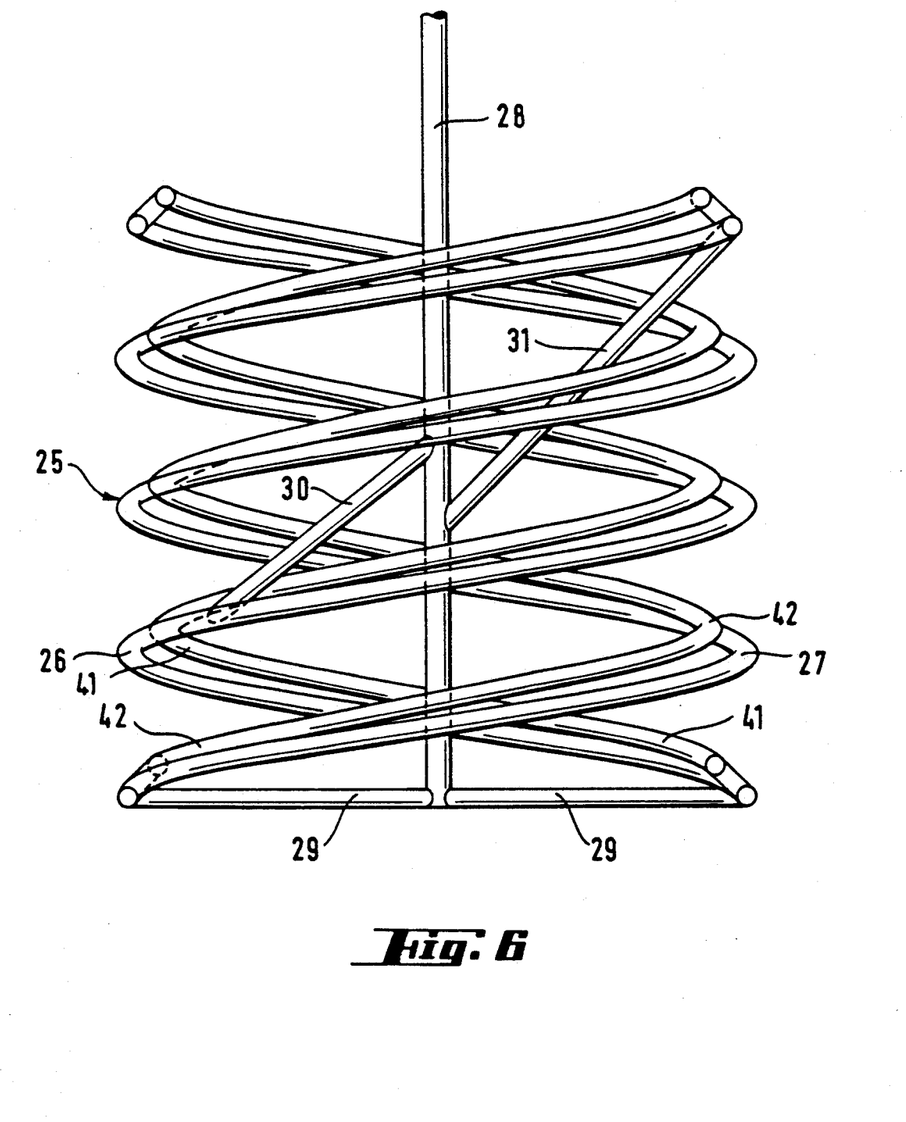
FIG. 6 is a side-view illustration of another embodiment of the spiral stirrer of the invention.

It is naturally clear that the detailed structure of a spiral stirrer can be modified in many ways, without departing from the scope of the present invention, by creating the kind of vertical circulation described above. In this connection we describe, with reference to FIG. 6, another modification whereby the vertical circulation is created at an exceptionally low speed of rotation. The basic structure of the stirrer is the same as the one described above, although the diameter of the stirrer is ideal within the range 0.7-0.75 times the diameter of the mixer cylinder. With respect to the first spiral tube 26, at a distance of 0.5-1.5 times the diameter of the tube, and at an angle of 45° inclined upwards, there is installed another corresponding spiral 41, made of similar material, which spiral is supported against the outer tube 26 for instance with the division 225°. With respect to the tube 27, there also is installed, according to the same proportional relations, another spiral tube 42. The support rods 29, 30 and 31 are also made of the same tube material as the spirals.

We claim:

1. An apparatus for mixing two phases of a liquid-liquid extraction process with each other, and for separating the phases of a dispersion created by such mixing, comprising a mixer, shaped as a cylinder, a presettler arranged around the mixer cylinder, and a settler adjacent to the pre-settler, as well as a solution pump installed inside the settler, to which pump the phases to be fed in the mixer are conducted, and from which pump the phases are fed into the mixer so that the extraction apparatus is formed as a compact rectangular unit, the length of the settler being at most equal to the settler width, the mixer having a stirrer which is formed of at least tow tubular coils, said coils being supported along an axis of the mixer by means of support rods; a flow reverser at a top of the mixer immediately below a liquid surface in the mixer, and a profile ring on an outer rim of the mixer having a smoothly curved bottom surface and an essentially horizontal top surface, outer rims of the mixer being provided with baffles.

2. The apparatus of claim 1, wherein there is installed a second mixer in the presettler so that after the mixer cylinder with respect to a flow direction in between the two mixers, arranged a feed duct, through which the dispersion is made to flow, via a slot baffle, towards an end of the presettler.

3. The apparatus of claim 3, wherein the diameter of the stirrer is 0.5-0.75 times the diameter of the mixer.

4. The apparatus of claim 4, wherein the height of the stirrer is 0.6-0.9 times the height of the mixer.

5. The apparatus of claim 1, wherein topmost support rods descend towards the axis.

6. The apparatus of claim 1, wherein a bottom surface of the flow reverser is profiled, so that it turns from an essentially horizontal outer edge towards the axis, and that the flow reverser top surface is essentially horizontal.

7. The apparatus of claim 1, wherein the profile ring extends from the distance 0.75 times a radius of the mixer cylinder as far as the circumference of the mixer cylinder.

8. A method for mixing two different solution phases in liquid-liquid extraction in a controlled fashion for creating a dispersion to cause material transfer between the phases and for separating the phases after material transfer has taken place therebetween while preventing the creation of emulsions and aeration of the dispersion, comprising: mixing together the two phases to be dispersed to form a mixture; feeding the mixture into a bottom part of a mixer; setting the mixture into vertical circulation by rotating a stirrer in the mixer at a low circumferential speed for preventing aeration and preventing the formation of an emulsion and thereby causing the mixture to flow upward near a periphery of the mixer, causing the mixed phases to flow smoothly toward the interior of the mixer after flowing upward and then causing the mixture to flow downward near the center of the mixer; dividing the mixture flow after the mixture has flowed downward towards the bottom of the mixer and then causing the mixture to flow towards the periphery of the mixer; preventing horizontal circulation of the mixture by means of baffles; creating a dispersion of well mixed phases by means of said vertical circulation; continuously discharging the dispersion of well mixed phases as overflow from the mixer into a presettler space surrounding the mixer; causing a flow rate of the dispersion in the presettler space to vary and thus causing small droplets in the dispersion to collide and coalesce into larger drops resulting in partial clarification of the dispersion in the presettler; discharging the partially clarified dispersion from the presettler space as a wide flow to a settler which settler is no longer than it is wide so that the dispersion is clarified by the production of two thin layers of different clear solutions.

9. The method of claim 8, wherein radial stirring is caused in between the upward and downward flows of the dispersion.

10. The method of claim 9, wherein the mixer has a radius R and the mixture flows upward in a peripheral zone surrounding a central zone of downward flow having a radius of no less than 0.7R.

* * * * *

UNITED STATES PATENT AND TRADEMARK OFFICE
CERTIFICATE OF CORRECTION

PATENT NO. : 5,185,081
DATED : February 9, 1993
INVENTOR(S) : Bror G. Nyman et al It is certified that error appears in the above-identified patent and that said Letters Patent is hereby corrected as shown below:

Column 3, line 1: first word "to" should be deleted.

Column 5, line 61: "diameter whereof of the" should read: --diameter of the--.

Column 7, line 50: "apparatus of claim 3" should read: --apparatus of claim 1--.

line 52: "apparatus of claim 4" should read: --apparatus of claim 1--.

Column 8, line 49: "apparatus of claim 9" should read: --apparatus of claim 8--.

Signed and Sealed this

Twenty-third Day of November, 1993

Attest:

BRUCE LEHMAN

Attesting Officer

Commissioner of Patents and Trademarks